United States Patent [19]

Stahl

[11] Patent Number: 4,495,457
[45] Date of Patent: Jan. 22, 1985

[54] METHOD OF PREVENTING ERRONEOUS GEAR SELECTION IN A VEHICLE TRANSMISSION

[75] Inventor: Hans V. Stahl, Södertälje, Sweden
[73] Assignee: Saab-Scania Aktiebolag, Sweden
[21] Appl. No.: 322,851
[22] Filed: Nov. 19, 1981

[30] Foreign Application Priority Data
Nov. 28, 1980 [SE] Sweden .................... 8008402-3

[51] Int. Cl.³ .......................................... B60K 41/04
[52] U.S. Cl. .................................... 364/424.1; 74/866
[58] Field of Search ................. 74/866; 364/720, 607, 364/608, 424.1

[56] References Cited

U.S. PATENT DOCUMENTS

| | | | |
|---|---|---|---|
| 4,086,992 | 5/1978 | Hamada et al. | 192/0.076 |
| 4,208,925 | 6/1980 | Miller et al. | 74/866 |
| 4,289,222 | 9/1981 | Esthimer | 192/0.033 |
| 4,373,619 | 2/1983 | Schritt et al. | 192/0.09 |
| 4,393,732 | 7/1983 | Suzuki | 74/866 |

Primary Examiner—Gareth D. Shaw
Assistant Examiner—Oleg Schatoff
Attorney, Agent, or Firm—Ostrolenk, Faber, Gerb & Soffen

[57] ABSTRACT

The invention relates to a method for preventing at a vehicle gearbox selection of an operationally erroneous gear in the absence of a gear change regulating speed signal. The absence of the gear change regulating signal is detected by a fault detection circuit or by a fault detection routine, which thereby sends an output signal to an operative circuit or the like. The operative circuit ensures that erroneous gear selection is prevented and-/or triggers a fault indication.

With the intention of ensuring that a fault already existing when the vehicle starts can be detected, the invention is essentially distinguished in that during the fault detection routine it is determined whether the engine is running, whether a forward gear is engaged, the clutch is engaged, and whether and with these conditions extant whether the speed has attained a given minimum speed within a predetermined time. If said minimum speed is not attained, an output signal is sent to the operative circuit which presents an erroneous gear selection and/or triggers a fault indication.

3 Claims, 4 Drawing Figures

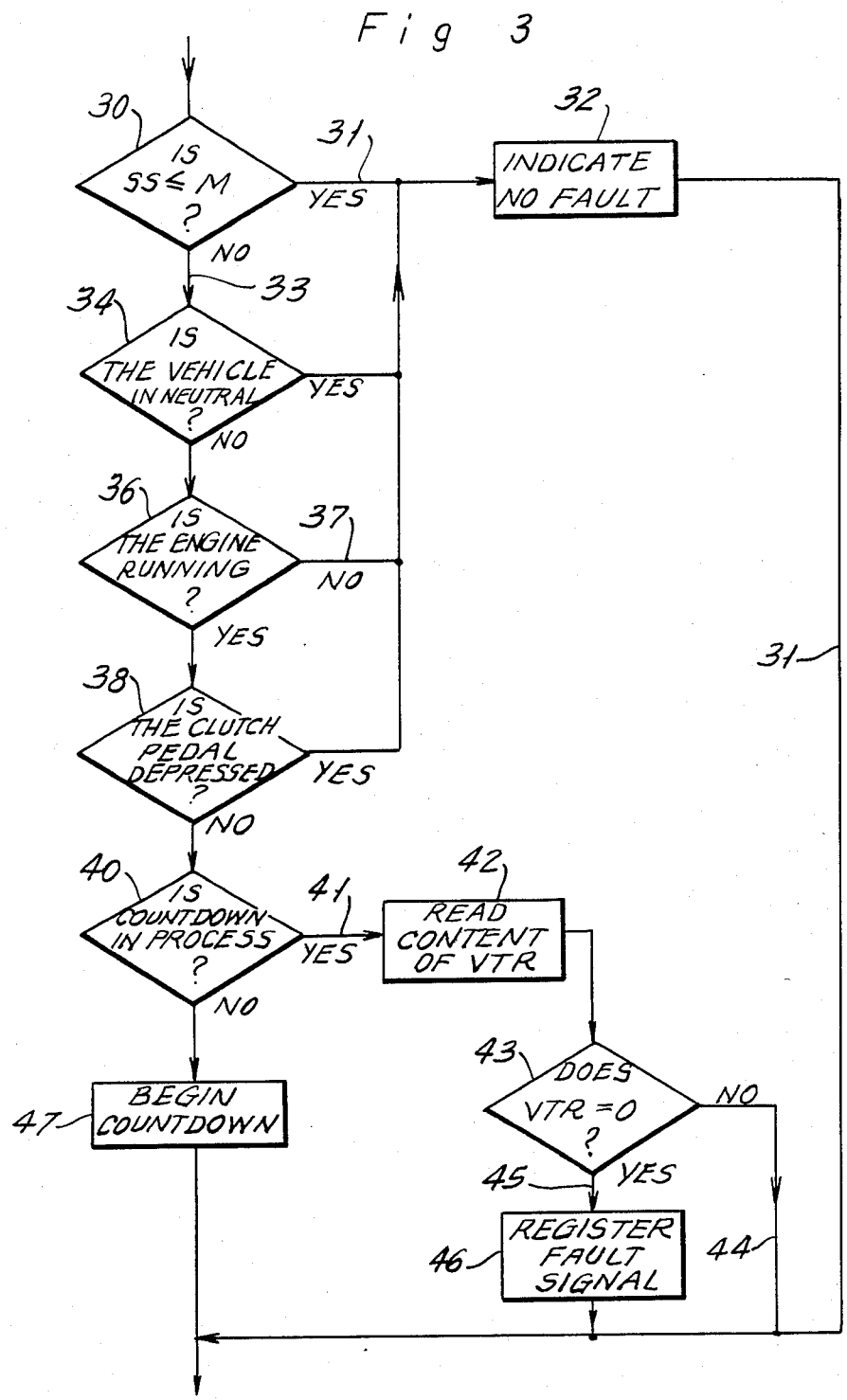

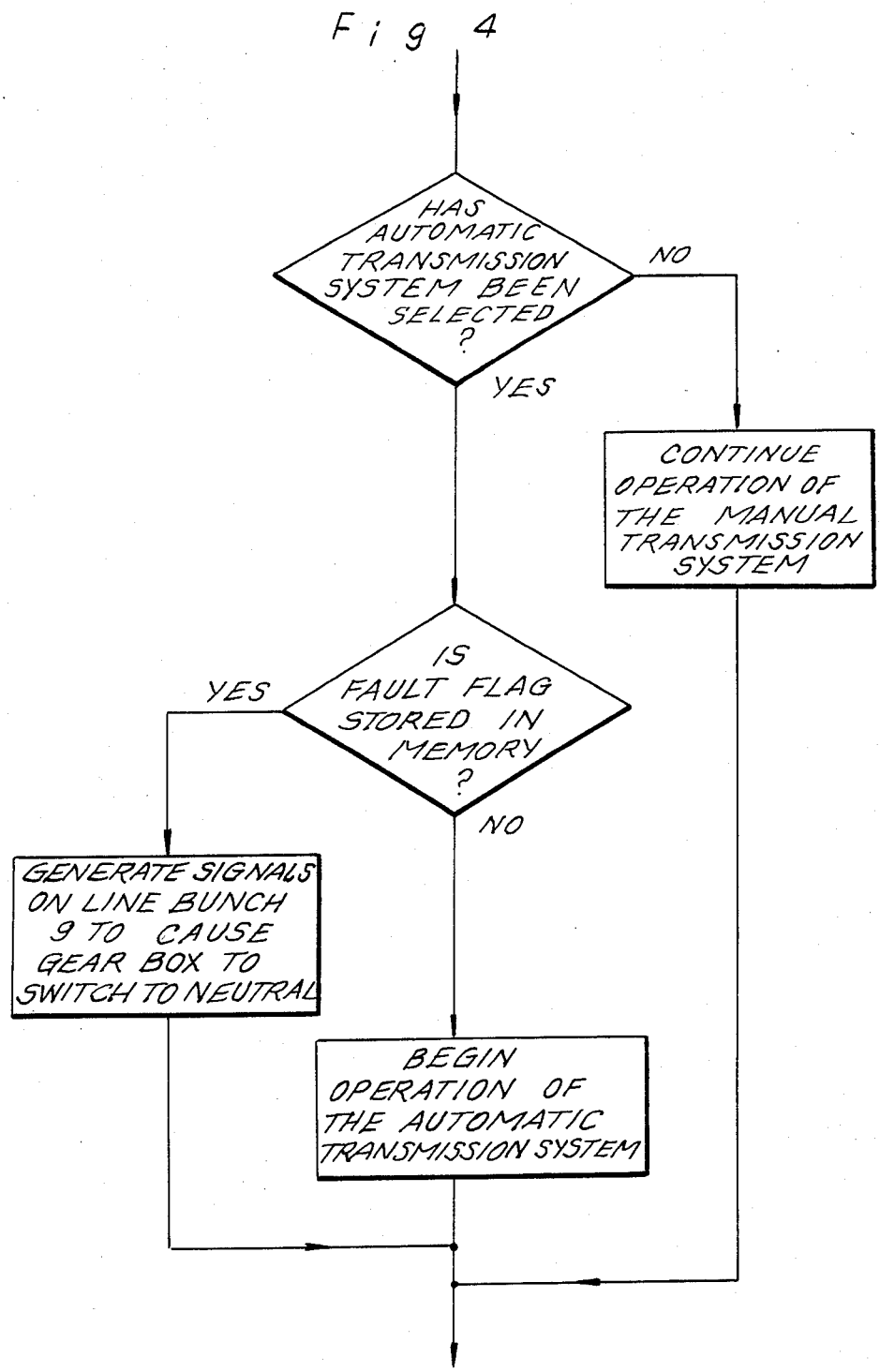

METHOD OF PREVENTING ERRONEOUS GEAR SELECTION IN A VEHICLE TRANSMISSION

BACKGROUND OF THE INVENTION

The present invention relates to a method for preventing a vehicle gearbox, preferably provided with both a manual and an automatic gear selection system, from being placed in an operationally erroneous gear in the absence of a gear change regulating speed signal, the absence of such signal being detected by a fault detection circuit or by a fault detection routine, which thereby gives an output signal to an operative circuit or the like, for ensuring that an erroneous gear selection (one wherein the speed of the input shaft to the transmission and the speed of the output shaft of the transmission are not matched by the gear ratio selected) is prevented and/or for triggering fault indication in appropriate alarm means.

A method of the foregoing type is already known for an automatic gear selection system. In this known system, however, fault detection can only take place when the vehicle is driven at least a given minimum speed. A fault in the speed transducer or a fault preventing the use of the speed signal in the gear selection system may, however, be present when the vehicle is first started. In such a case, the fault might not be discovered until the gear selection system is unable to execute new gear selections. Such fault detection is not suitable for vehicles where, apart from the automatic gear selection system, there is also the availability of manual gear selection. In such cases, it is necessary to be able to detect faults when the vehicle is first started so as to prevent the automatic gear selection system from selecting the first or starting gear when the gear selection system is switched from a manual mode (wherein a second or higher gear may have been selected) to an automatic mode. If the transition takes place during driving, the engagement of the starting gear can have disastrous consequences from mechanical as well as from traffic safety aspects.

BRIEF DESCRIPTION OF THE INVENTION

The present invention has the task of eliminating such risks, and with this objective in mind the invention is distinguished by a number of transducers being arranged to sense and generate thereto corresponding output signals representing the following conditions: that the engine is running, that a forward gear is engaged, and that a clutch transmitting torque between engine and driving wheels is in a torque-transmitting position, in which the output r.p.m. of the engine conforms to the input r.p.m. of the gearbox, and that the output signals of the transducers are processed in a fault detection circuit or routine which sends to the operative circuit an output signal representing the fault if, during a predetermined time interval, the output signal of the speed transducer represents a vehicle speed lower than a predetermined limiting value, simultaneously as during said time interval signals are generated indicating that the engine is running, that a forward gear is engaged and that the clutch is in a torque-transmitting position.

BRIEF DESCRIPTION OF THE DRAWINGS

Other features distinguishing the invention will be seen from the description below and the following patent claims. The description is made with reference to the attached drawings, where FIG. 1 schematically illustrates a system for automatic gear selection, FIG. 3 is a flow diagram for the gear change program error detection routine.

FIG. 4 is a flow diagram illustrating how the main gear change program prevents an erroneous gear selection when an erroneous speed signal has been detected in the routine of FIG. 3.

DETAILED DESCRIPTION OF THE PREFERRED EMBODIMENTS

The exemplified arrangement is primarily intended for application in an automatic gear selection system for heavy vehicles, the selected gear being engaged in a gear change process initiated manually by the driver. A conventional mechanical transmission with a main clutch located between the engine and the gearbox can thus be retained unchanged, with the result that the comparatively high efficiency of the transmission can be utilized. In an advantageous implementation of the gear selection system, the automatic gear selection may be disengaged to enable a purely manual gear selection. The system also allows casual manual operation even if the automatic gear selection system is engaged. After manual selection of a different gear, the driver has a certain time, ten seconds for example, to initiate the gear change process. The initiation may, for example, take place by the clutch being depressed, the system then sensing the movement and thereafter automatically taking care of the gear change. When the gear change is completed, this is indicated to the driver by a buzzer and/or an indication lamp, whereupon the driven can again engage the clutch so as to select a new gear if desired.

Figure 1:
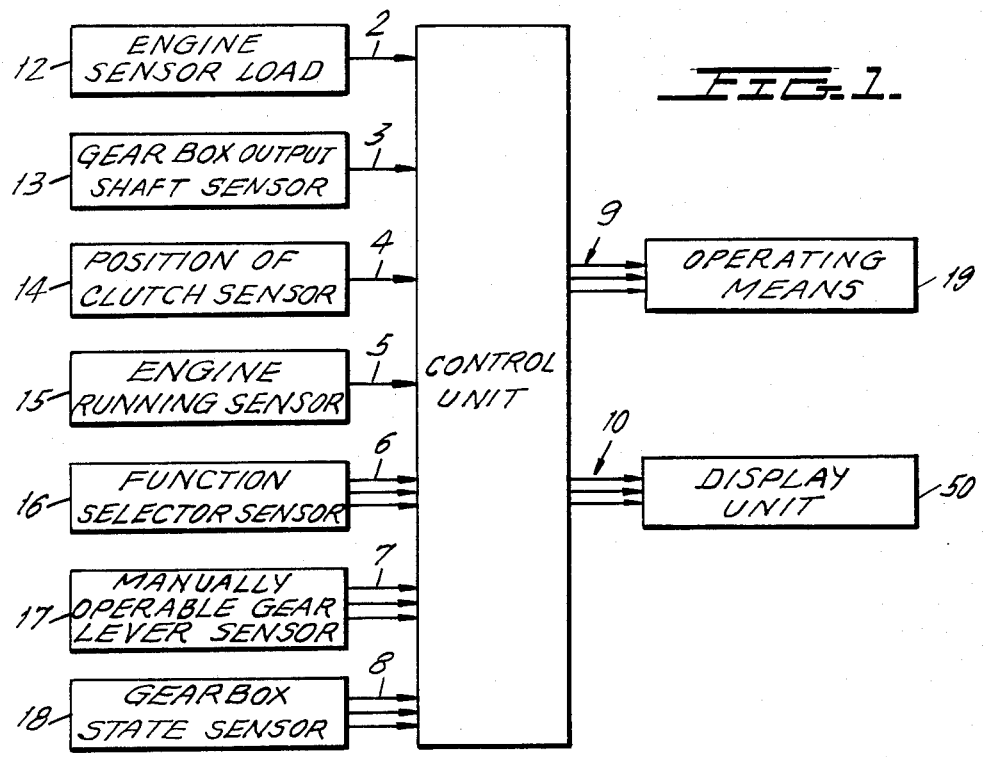

The gear selection system in question operates with input signals relating to a number of parameters which are schematically illustrated in FIG. 1. A signal representing the engine load is thus fed to a control unit 1 via a line 2. With an engine equipped with supercharging, the load signal is suitably proportional to the boost pressure in the engine induction system 12. In another application, the position of the vehicle accelerator pedal may constitute a measure of engine load. Via a line 3 there is fed to the control unit 1 a signal corresponding to the speed of a vehicle wheel, which in most cases is proportional to the speed of the vehicle. In practice, it is suitable to sense the r.p.m. of the gearbox output shaft 13. A signal responsive to the position of a manually operable clutch 14 interfacing the engine and gearbox is applied to the control unit 1 via a line 4 as well as a signal via a line 5, the latter signal being responsive to whether the engine is running or not. The latter state is suitably sensed at the generator 15 conventionally connected to the engine. The input signal in a line bunch 6 represents the position of a function selector 16 operable by the driver and which includes the four following alternative positions: a first position relating to driving with manual gear selection, a second position relating to driving with automatic gear selection, a third position relating to selection of neutral, and a fourth position relating to selection of reverse gear. A signal from a manually operable gear lever 17 is fed to the control unit 1 via a line bunch 7, and via a line bunch 8 signals representing the state of the gearbox 18, i.e. if a gear is engaged and if so, which one.

In response to the input signals, the control unit 1 generates output signals. Output signals are fed via a line bunch (i.e., a plurality of lines) 9 to operative means 19 for executing the gear change, e.g. to a number of solenoid valves controlling compressed air or pressurized hydraulic oil to a number of cylinder units executing the gear change movements. Output signals are also fed via a line bunch 10 to a display unit 50 having a buzzer or similar means for notifying the driver of the gear selection, the gear change completion or whether errors have occured in the control system.

Figure 2:
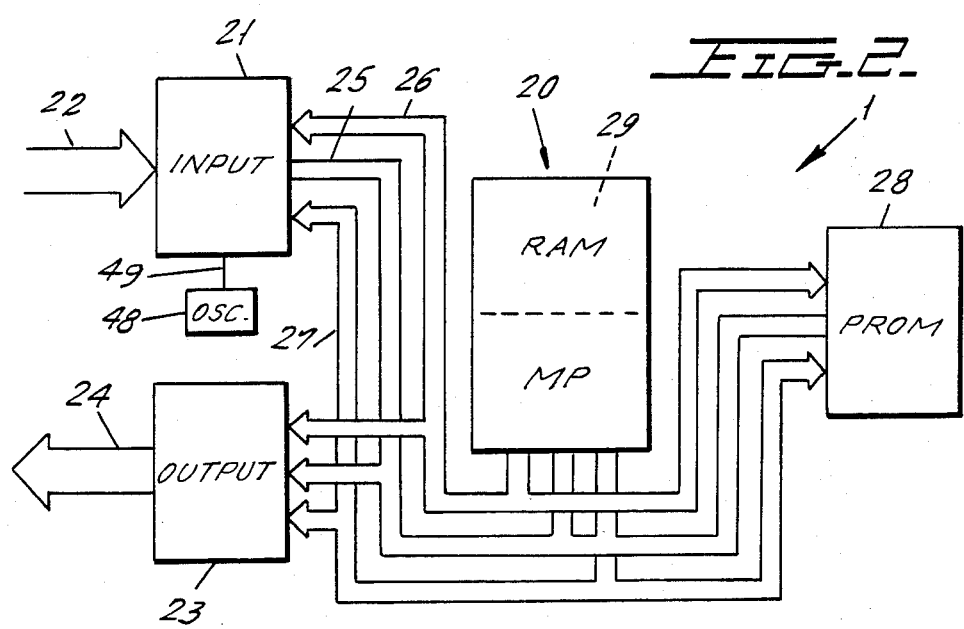
FIG. 2 illustrates in a similar manner a system unit included in the system of FIG. 1.

The control unit illustrated in FIG. 2 is built up around a microprocessor denoted MP 20, which in a manner known per se via a number of input circuits 21 is conventionally fed with input signals via the lines 2-8, here represented by a line bunch 22. Output circuits 23 adjust the control unit's signals on the line bunches 9, 10, here represented by a line bunch 24, to what is required for actuation of the operative means 19 and the display/buzzer unit 50. In the input and output circuits 21, 23 there are also protective circuits which protect the MP 20 against signals disturbing its function. The output circuits 23 also include an amplifier which amplifies the output signal of the control unit to a level required to actuate the solenoid valves.

Via data lines, address lines and control lines, i.e. data bus 25, address bus 26 and control bus 27, the MP 20 coacts in a manner known per se in the microcomputer art with the input and output circuits 21, 23 as well as with an external programmable read-only memory denoted PROM 28, and a random access memory denoted RAM 29, built into the MP 20. This is the case, for example, if the MP 20 is of the 6802 type (e.g. made by Motorola), which type has been found advantageous in applying the present invention.

In the control unit 1 there is also included a low-frequency oscillator 48, the pulsed output signals of which are applied via the line 49 to the input circuits 21. Each signal pulse from the oscillator 48, as with each pulse in the signal pulses sent from a speed transducer, results in that the MP 20 is inhibited from executing an interrupt program for speed and acceleration calculation.

According to the interrupt program, which is not described in more detail, the speed is calculated from the number of speed pulses arriving between two pulses from the low-frequency oscillator 48, which correspondes to a time of 0.5 seconds. The speed value thus represents a mean value for said period of time. The speed variation is calculated as the difference between two sequentially calculated speed values. With the aid of oscillator pulses, the interrupt program is furthermore utilized to carry out a count-down on time registers utilized in performing the program.

A flow diagram for the part of the gear change program constituting the fault detection routine is illustrated in FIG. 3. It starts with a comparing operation step denoted 30, at which it is decided whether the speed signal SS represents a vehicle speed which is lower than or equal to a predetermined speed M, e.g. 2 km/h. If the speed is higher than 2 km/h, a flow path 31 is followed to a signal processing operation step 32, at which there is indicated that the speed transducer is without fault. From step 32, the flow path 31 condinues to the fault detection routine output, from which the remaining part of the gear change program is performed before the fault detection routine is once again started.

If it is established at step 30 that the speed is lower than or equal to 2 km/h, a flow path 33 is followed to a comparison step 34, in which it is decided whether the vehicle is in neutral. If it is, a flow path is taken to step 32, and if the engaged gear is a gear other than the neutral gear, the flow path 33 goes to a comparing operation step 36, where it is decided whether the engine is running or not. If the engine is not running, a flow path 37 is followed to step 32; otherwise the flow path 33 leads to a comparing operation step 38, in which it is decided whether the clutch pedal is depressed or not. If the clutch pedal is depressed, a flow path is followed to step 32; otherwise the flow path 33 leads to a comparing operation step 40, where it is decided whether the count-down of a waiting time register VTR is in progress or not. If the count-down is in progress, which often occurs since the fault detection routine is performed many times during the count-down of the waiting time register, a flow path 41 is followed to an operation step 42, in which the content in the VTR is read, subsequent to which it is decided in a following comparing operation step 43 whether said content is equal to zero. If this is not the case, a flow path 44 leads directly to the output of the routine, for carrying out the remaining part of the gear change program. If it is established in step 43 that the content in the VTR is zero, a flow path 45 leads to an operation step 46, in which it is indicated that the count-down of the VTR is no longer in progress (i.e., that the predetermined time period has expired) and that a fault in the speed measurement is present, which is registered in a fault flag in memory. The fault flag is read in a gear selection program (see FIG. 4) in the subsequent main program, and when the fault flag has been registered in the memory, neutral is thereby selected by placing an appropriate signal on line bunch 9. From step 46, the flow path 45 leads to the output of the routine.

If it is established in step 40 that the count-down of the VTR is not in progress, the flow path 33 leads to an operation step 47, in which the count-down of the VTR is begun, whereafter the flow path 33 leads to the output of the routine. The main program is subsequently executed before the fault detection routine is once again performed. The count-down of the VTR is performed with the aid of the previously mentioned count-down routine in the interrupt program.

The fault detection routine illustrated by means of the flow diagram in FIG. 3 thus ensures that faults in the speed measurement are only registered if a gear other than neutral is engaged, if the engine is running, if the clutch pedal is not depressed, and in the case where, with these conditions extant, no speed signal representng a given minimum speed has been registered during the time for which the VTR is adjusted. The time is suitably between 5 and 10 seconds to allow slip-starting the vehicle, while the lowest speed which should suitably be attained during said time may be about 2 km/h.

I claim:

1. A method for preventing an automatic selection of an erroneous gear in a gearbox which is provided with a gear selection system which is operable in both a manual and an automatic selection mode and which may switch from the manual to the automatic mode when the system is operating in the manual mode and the gearbox is in a gear which is higher than the first gear, said method comprising the steps of:

generating, from the time that the engine is first started, output signals indicative of whether the engine is running, whether a forward gear is engaged, whether a manually operable clutch interfacing the gearbox and the engine is in a torque-transmitting position, and whether the vehicle speed is lower than a predetermined value;

generating a fault signal if, during a predetermined time interval, said output signals continually indicate that said vehicle speed is lower than said predetermined value, that said engine is running, that a forward gear is engaged and that said clutch is in said torque-transmitting position; said predetermined time interval starting from the time that said output signals simultaneously indicate that said engine is running, that a forward gear is engaged and that said clutch is in said torque-transmitting position; and inhibiting the automatic selection by said gear selection system of a gear other than neutral in said gearbox due to the generation of said fault signal.

2. A method as claimed in claim 1, wherein said time interval is between 5 and 10 seconds.

3. A method as claimed in either claim 1 or 2, wherein said predetermined value for the vehicle speed is about 2 km/h.

* * * * *